United States Patent
Watanabe

(10) Patent No.: US 6,261,617 B1
(45) Date of Patent: Jul. 17, 2001

(54) SNACK CAKE AND METHOD OF PRODUCING THE SAME

(75) Inventor: Isao Watanabe, Katakura-cho (JP)

(73) Assignee: Ikuko Watanabe, Beppu (JP)

( * ) Notice: Subject to any disclaimer, the term of this patent is extended or adjusted under 35 U.S.C. 154(b) by 0 days.

(21) Appl. No.: 09/477,334

(22) Filed: Jan. 4, 2000

(30) Foreign Application Priority Data

Jan. 6, 1999 (JP) .................................................. 11-001106

(51) Int. Cl.⁷ .................................. A23C 9/14; A23L 3/00
(52) U.S. Cl. .......................... 426/242; 426/243; 426/559; 426/560; 426/637; 426/473; 426/482
(58) Field of Search ..................................... 426/560, 242, 426/637, 465, 454, 473, 482, 243, 559

(56) References Cited

U.S. PATENT DOCUMENTS

| | | | |
|---|---|---|---|
| 5,049,711 | * | 9/1991 | Avgvst ............................. 289/10.55 |
| 5,393,544 | * | 2/1995 | Hannah et al. ...................... 426/250 |
| 5,441,758 | * | 8/1995 | Lewis et al. ........................ 426/637 |
| 5,470,600 | * | 11/1995 | Petelle et al. ....................... 426/237 |
| 5,802,959 | * | 9/1998 | Benson et al. ........................ 99/355 |
| 5,891,496 | * | 4/1999 | Hannah et al. ...................... 426/102 |

FOREIGN PATENT DOCUMENTS 7-327628    12/1995   (JP) .

\* cited by examiner

*Primary Examiner*—Nina Bhat
(74) *Attorney, Agent, or Firm*—Armstrong, Westerman, Hattori, McLeland & Naughton, LLP

(57) ABSTRACT

Potatoes are skin pared, pelletized, steamed, dried and inflated into thin bars, sprayed with seasoning without oil or with a limited quantity of oil and dried such that a snack cake containing little oil and having a crunching feel when chewed is produced.

6 Claims, 1 Drawing Sheet

SNACK CAKE AND METHOD OF PRODUCING THE SAME

BACKGROUND OF THE INVENTION

The present invention relates to a snack cake produced through a process in which no oil or a limited quantity of oil is used to the material and a method of producing the same.

In the general snack cake production, potato chips or fried potatoes are prepared by slicing potatoes or cutting them into sticks, frying them with oil, and spraying salts or other seasonings.

As a result, many of the conventional snack cakes which are fried with oil tend to have a high calorific value. Nowadays, many people are health-oriented to such an extent that prevention of corpulence and resultant diseases are drawing much public attention and snack cakes with low calorific values are much in demand.

Given the situation, it may be proposed that snack cakes are cooked without frying with oils. However, there are problems that such food lacks a sufficiently good taste and a crunching feel when chewed.

SUMMARY OF THE INVENTION

The present invention is provided to solve said problems and its object is to provide a snack cake and a method of producing such snack cakes which are prepared without frying with oil but give a crunching feel when chewed to the same extent as the conventional snack cakes while showing a low calorific value contributing to prevention of corpulence and resultant adults' diseases.

The present invention is made to provide a snack cake which accomplishes the above mentioned problems and its means includes a snack cake produced by skin paring potatoes, pelletizing said skin pared potatoes, steaming and drying said pelletized potatoes, inflating said dried potatoes into a form of thin bars, spraying a seasoning, and drying said inflated potatoes such that the resultant snack cake gives a crunching feel.

The present invention also provides a method of producing a snack cake and its means includes a method of producing a snack cake comprising a first step of skin paring potatoes; a second step of slicing and pelletizing said skin pared potatoes in a predetermined thickness; a third step of steaming said pelletized potatoes; a fourth step of drying said steamed potatoes to remove moisture contained therein; a fifth step of inflating said dried potatoes after heating and pressurizing; a sixth step of spraying a seasoning to said inflated potatoes; and a seventh step of drying said seasoning sprayed potatoes to remove the moisture therein.

Further, it is preferable that said drying in said fourth and seventh steps is done by means of far infrared rays or a microwave generated in a microwave oven. It is also preferable that said fifth step is conducted by non-oil spraying or said sixth step is conducted by spraying a limited quantity of oil.

Since the snack cake according to the present invention adopts the afore-mentioned structure, it is possible to obtain a sufficiently good taste and give a crunching feel when chewed while showing a low calorific value contributing to prevention of corpulence and resultant adults' diseases.

DETAILED DESCRIPTION OF THE INVENTION

Figure 1:
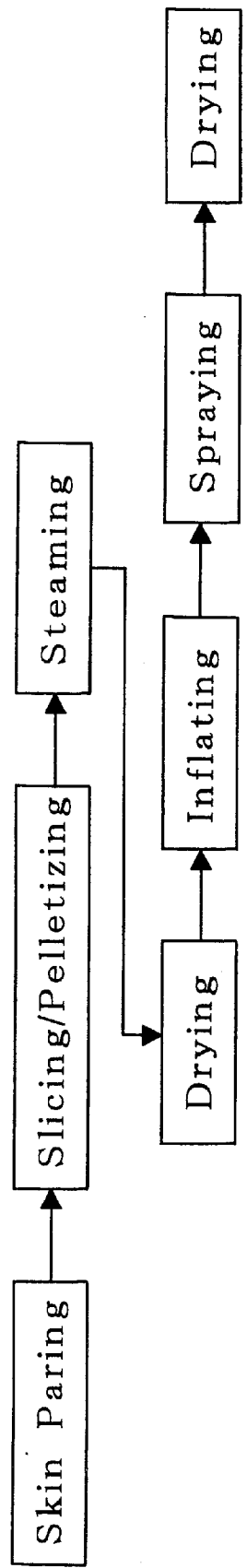
FIG. 1 is a process drawing of one example of the snack cake production according to the present invention.

Hereinafter, the invention relating to the method of producing a snack cake will be explained.

The method of producing a snack cake in the embodiment of the invention with reference to FIG. 1. Therein, potatoes will be used as a raw material.

As a first step, potatoes are subjected to skin paring or peeling. Then as a second step, said potatoes are sliced into a predetermined thickness. If some of the sliced potatoes in said slicing step are too big, such sliced potatoes are further pelletized. As a third step, sliced or pelletized potatoes are steamed. As a fourth step, many of the steamed potato pellets are dried to reduce the percentage of the moisture contained therein down to a predetermined quantity. Use of far infrared rays or a microwave generated a microwave oven is preferable, in which drying is done in a short time and all the way to the cores thereof and it is most preferable to give a crunching feel when chewed.

Next, in the fifth step, the pellets dried to remove the moisture contained therein is heated and pressurized by means of a heating/pressurizing device. Then, after a passage of a predetermined time, said pellets are subjected to an atmospheric pressure such that said pellets instantly inflates. Then, as a sixth step, the thus inflated pellets are subjected to spraying of seasonings including salt, glutamic acid, or other extracts (for example, beef extract) without oil with a limited quantity of oil. Then again, as a seventh step, said pellets are dried by means of far infrared rays or the microwave generated in the microwave oven. Said drying may include a baking step. As a result, a cake having "umami" or a delicious taste while giving a crunching feel is produced.

Next, concrete examples in the embodiment explained with reference to FIG. 1 will be given.

After the skin paring of potatoes, said skin pared potatoes are sliced to the predetermined size and thickness (for example, an area of 2 cm$^2$, and the thickness of 4 mm). If some of the sliced potatoes are too big, such potatoes are pelletized. Then, the pelletized potatoes are subjected to steam for heating the same.

Said pellets are heated by means of a far infrared dryer to reduce the percentage of moisture contained therein down to 5 to 20%. Then, said pellets are set in a heating/pressurizing device to heat and pressurize at a temperature of 180 to 250° C. and under a pressure of 2,000 to 3,000 kg/cm$^2$ and then, are taken out therefrom such that the pellets inflate instantly.

The surfaces of said inflated potato pellets are seasoned by spraying thickened polysaccharides are dried again to reduce the percentage of the moisture contained therein down to 2 to 10% again by means of the far infrared dryer. As a result, a snack cake having "umami" or a delicious taste and giving a crunching feel is produced.

In this connection, it was found to be most preferable that potato pellets containing moisture of 13% are heated and pressurized at a temperature of 200° C. under the pressure of 2,500 kg/cm$^2$ to reduce the moisture down to 4% because the thus dried snack cake has "umami" or a delicious taste and the crunching feel when chewed.

The present invention provides a low calorie and low fat snack cake having an effect of preventing corpulence and resultant adult's diseases by slicing a skin pared potatoes, pelletizing and steaming the same, inflating into a form of thin bars and drying substantially without oil such that the resultant product having an effect of giving a crunching feel when chewed is produced.

Further, said drying step uses an electromagnetic means such as far infrared rays or a microwave generated in a microwave oven such that the pellets are dried all the way to the cores thereof in a short time.

Further, since the skin pared potatoes are pelletized after a slicing step, the potato pellets are steamed, dried to remove the moisture therein, pressurized, inflated and sprayed such that the inflated pellets are coated with seasonings without oil or with a limited quantity of oil, the resultant snack cake product contains little fats except the material's own oils and fats. Moreover, it has an effect that the production process is simple and the low cost production of the snack cake which is suited to mass production is possible.

What is claimed is:

1. A snack cake produced by peeling potatoes, slicing and steaming said peeled potatoes, drying said sliced potatoes by means of radiations having a heating effect, pressurizing said dried potato slices and thereafter subjecting the pressurized potatoes to an atmospheric pressure to inflate instantly, spraying a seasoning thereto, and drying said inflated potatoes by means of radiations having a heating effect such that the resultant snack cake gives a crunching feel when chewed.

2. A method of producing a snack cake comprising a first step of peeling potatoes; a second step of slicing said peeled potatoes in a predetermined thickness; a third step of steaming said sliced potatoes; a fourth step of drying steamed potatoes by means of radiations having a heating effect to remove moisture contained therein; a fifth step of pressurizing said dried potatoes and thereafter subjecting the same to an atmospheric pressure to inflate instantly; a sixth step of spraying a seasoning to said inflated potatoes; and a seventh step of drying said seasoning sprayed potatoes by means of radiations having a heating effect to remove moisture therein.

3. A method of producing a snack cake as set forth in claim 2, wherein said drying in said fourth and seventh steps is done by means of far infrared rays.

4. A method of producing a snack cake as set forth in claim 2, wherein said drying in said fourth and seventh steps is done by means of microwaves generated in a microwave oven.

5. A method of producing a snack cake as set forth in any one of claims 2 through 4, wherein said sixth step is conducted by non-oil spraying.

6. A method of producing a snack cake as set forth in any one of claims 2 through 4, wherein said sixth step is conducted by spraying a limited quantity of oil.

* * * * *